United States Patent
Acharya et al.

(10) Patent No.: US 7,680,773 B1
(45) Date of Patent: Mar. 16, 2010

(54) SYSTEM FOR AUTOMATICALLY MANAGING DUPLICATE DOCUMENTS WHEN CRAWLING DYNAMIC DOCUMENTS

(75) Inventors: Anurag Acharya, Campbell, CA (US); Arvind Jain, Sunnyvale, CA (US); Arup Mukherjee, San Jose, CA (US)

(73) Assignee: Google Inc., Mountain View, CA (US)

( * ) Notice: Subject to any disclaimer, the term of this patent is extended or adjusted under 35 U.S.C. 154(b) by 361 days.

(21) Appl. No.: 11/097,687

(22) Filed: Mar. 31, 2005

(51) Int. Cl.
*G06F 17/30* (2006.01)

(52) U.S. Cl. .............................. 707/3; 707/200; 707/10; 707/9; 709/245; 709/217; 709/219

(58) Field of Classification Search ................... 707/5, 707/200, 3, 10, 9; 709/245, 217, 219
See application file for complete search history.

(56) References Cited

U.S. PATENT DOCUMENTS

| | | | | |
|---|---|---|---|---|
| 6,038,560 A | * | 3/2000 | Wical | 707/5 |
| 6,038,567 A | * | 3/2000 | Young | 707/103 R |
| 6,137,911 A | * | 10/2000 | Zhilyaev | 382/225 |
| 6,647,381 B1 | * | 11/2003 | Li et al. | 707/3 |
| 7,062,487 B1 | * | 6/2006 | Nagaishi et al. | 707/6 |
| 2002/0073165 A1 | * | 6/2002 | McNulty et al. | 709/217 |
| 2002/0133627 A1 | * | 9/2002 | Maes et al. | 709/246 |
| 2005/0131935 A1 | * | 6/2005 | O'Leary et al. | 707/102 |
| 2005/0165800 A1 | * | 7/2005 | Fontoura et al. | 707/100 |
| 2005/0228818 A1 | * | 10/2005 | Murthy et al. | 707/102 |
| 2006/0078047 A1 | * | 4/2006 | Shu et al. | 375/240.01 |

OTHER PUBLICATIONS

Author: Bharat et al Title: Mirror, Mirror on the Web Date: 1999 Publisher: Comput. Networks http://www.cumbrowski.com/carstenc/pdf/Mirror_Mirror_on_the_Web-A_Study_of_Host_Pair-with_Replicated_Content.pdf Pertinent pp. 22.*

* cited by examiner

*Primary Examiner*—Khanh B Pham
*Assistant Examiner*—Syling Yen
(74) *Attorney, Agent, or Firm*—Morgan, Lewis & Bockius LLP

(57) ABSTRACT

A system of reducing the possibility of crawling duplicate document identifiers partitions a plurality of document identifiers into multiple clusters, each cluster having a cluster name and a set of document parameters. The system generates an equivalence rule for each cluster of document identifiers, the rule specifying which document parameters associated with the cluster are content-relevant. Next, the system groups each cluster of document identifiers into one or more equivalence classes in accordance with its associated equivalence rule, each equivalence class including one or more document identifiers that correspond to a document content and having a representative document identifier identifying the document content.

24 Claims, 12 Drawing Sheets

Equivalence Rule Table  1001

| Cluster Name | Duplicate Rate | Equivalence Rule | Time Stamp | Analysis Flag |
|---|---|---|---|---|
| ... | ... | ... | ... | ... |
| Cluster Name | Duplicate Rate | Equivalence Rule | Time Stamp | Analysis Flag |

Representative URL Table  1002-1

| Equivalence Class Name | Representative URL | Content Checksum | Time Stamp |
|---|---|---|---|
| ... | ... | ... | ... |
| Equivalence Class Name | Representative URL | Content Checksum | Time Stamp |

⋮

Representative URL Table  1002-2

| Equivalence Class Name | Representative URL | Content Checksum | Time Stamp |
|---|---|---|---|
| ... | ... | ... | ... |
| Equivalence Class Name | Representative URL | Content Checksum | Time Stamp |

Fig. 10A

SYSTEM FOR AUTOMATICALLY MANAGING DUPLICATE DOCUMENTS WHEN CRAWLING DYNAMIC DOCUMENTS

FIELD OF THE INVENTION

The present invention relates generally to the field of search engines, and in particular, to a system for reducing the crawling of duplicate documents.

BACKGROUND OF THE INVENTION

Generally speaking, the web pages on the Internet can be classified into two categories, static and dynamic. A static web page is typically a document that has been generated in advance, managed by a file system and accessible to a web server, e.g., a HTML file. The content of a static web page is usually associated with a unique document identifier, e.g., a Uniform Resource Locator (URL).

In contrast, a dynamic web page is typically a document generated dynamically by a web server in response to a particular set of parameters specified by a user in the form of a document fetching request. An important feature distinguishing a dynamic web page from a static web page is that the content of the dynamic web page may no longer be associated with a unique document identifier. Instead, a dynamic web page may be referenced by multiple document identifiers at the same time. A search engine that does not take into account of this feature may waste a significant amount of resources, such as network bandwidth, storage space and processing time, by having web crawlers fetch many duplicate copies of dynamically-generated web pages that share the same content.

Therefore, there is a need for a system that automatically identifies and manages document identifiers that reference the same content and thereby reduces the waste of resources both on the search engine side and the web server side.

SUMMARY

A plurality of document identifiers are partitioned into multiple clusters, each cluster having a set of document parameters. An equivalence rule is generated for each cluster of document identifiers, the rule specifying which document parameters associated with the cluster are content-relevant and which ones are not. Next, each cluster of document identifiers are grouped into one or more equivalence classes in accordance with its equivalence rule, each equivalence class including one or more document identifiers that correspond to the same document content and a representative document identifier identifying the document content.

Upon receipt of a document identifier that has a set of document parameters, the equivalence rule for the document identifier is identified and the document identifier is updated by removing from it all content-irrelevant parameters in accordance with the identified equivalence rule. If there is an existing equivalence class associated with the updated document identifier, a first set of predefined operations are applied to a representative document identifier associated with the equivalence class, e.g., the document identifier is discarded. Otherwise, a second set of predefined operations are applied to the document identifier, e.g., fetching the document content using the document identifier, creating a new equivalence class for the document identifier and naming the document identifier as the representative document identifier of the newly-created equivalence class.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Like reference numerals refer to corresponding parts throughout the several views of the drawings.

FIG. 10A is a block diagram illustrating exemplary tables for storing equivalence rules and equivalence classes in accordance with some embodiments of the present invention.

DESCRIPTION OF EMBODIMENTS

Overview

Figure 1:
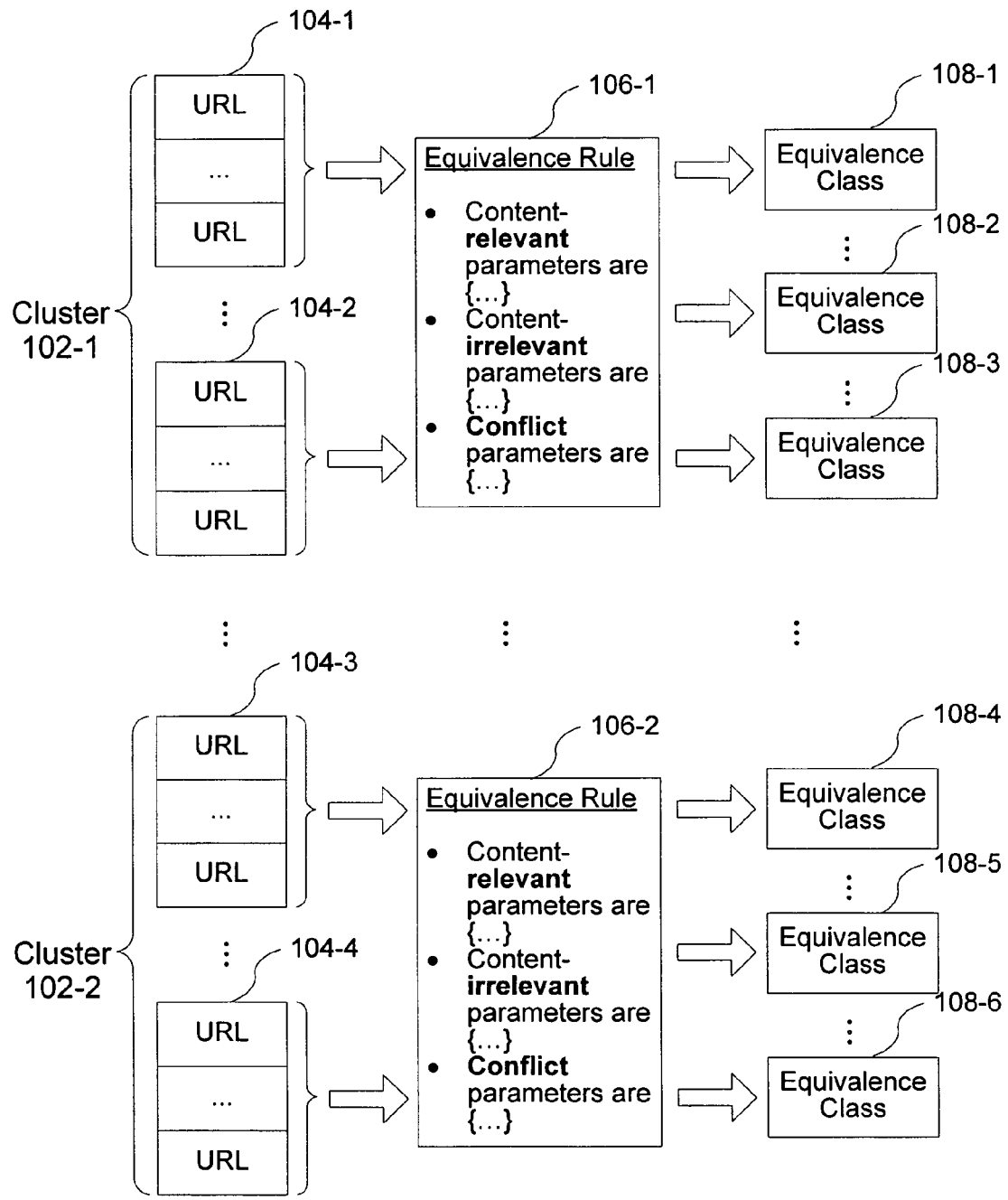
FIG. 1 is a block diagram schematically illustrating the process of generating equivalence rules and equivalence classes according to some embodiments of the present invention.

One method to avoid repeatedly fetching duplicate documents that share the same content is to develop a rule that can uniquely identify document identifiers associated with the duplicate documents from a large number of candidate document identifiers. The rule is applied to each individual document identifier to determine whether it references new document content (sometimes herein called unique document content) or duplicate document content. If it references new content, the document identified by the document identifier is scheduled for fetching. Otherwise, there is no need to retrieve the document corresponding to the document identifier.

The present invention focuses primarily on dynamically-generated web pages and their URLs for illustrative purposes and the term "dynamically-generated" is often skipped in the following exemplary embodiments. But the use of these embodiments should not be construed in any respect as a limitation to the application of the present invention. Each occurrence of the terms "web page" and "URL" may be substituted by more generic terms like "document" and "document identifier", respectively.

A URL typically comprises a hostname, a path and a set of URL parameters that are separated by "&", e.g., "http://www.foo.com/directory?a=1&b=2". However, it will be apparent to one skilled in the art that the present invention is readily applicable to any other URL or document identifier naming conventions.

For the benefit of the subsequent discussion, the definitions of several concepts are provided below:

Cluster—A cluster is a group of URLs that are likely to share the same interpretation of a set of URL parameters. URLs within a cluster usually have the same hostname and path up to the question mark "?", which are often referred to as the cluster name of the cluster. For example, the cluster name of a cluster including the URL "http://www.foo.com/directory?a=1&b=2" is "http://www.foo.com/directory?". Generally, each distinct cluster has a unique cluster name.

Equivalence class—An equivalence class is a set of URLs within a cluster that reference exactly the same web page or several web pages that are substantially similar to each other (e.g., if the only content difference between the web pages is their creation dates). Each equivalence class has a unique (i.e., distinct) equivalence class name (at least with respect to other equivalence classes in the same cluster) and the name may be derived by applying a corresponding equivalence rule to the set of URLs associated with the equivalence class.

Equivalence rule—An equivalence rule is a set of criteria deduced from a cluster of URLs. The rule specifies which parameter(s) of the cluster are content-relevant and which are not. An equivalence rule groups the URLs within a cluster into multiple equivalence classes, each class corresponding to a unique web page that is retrievable using a representative URL associated with the class.

Representative URL—A representative URL is a URL that has been chosen to represent other URLs within an equivalence class. It is often the first URL of the equivalence to be identified. All the other URLs within the equivalence class are assumed to reference the same web page as the representative URL. Therefore, the representative URL itself represents the entire equivalence class to other entities within a search engine, such as the pageranker and the indexer.

FIG. 1 is a block diagram schematically illustrating the process of generating equivalence rules and equivalence classes according to some embodiments of the present invention. Initially, a large number of URLs are partitioned into clusters (102-1, 102-2). URLs within each cluster usually share the same URL parameter interpretation and they are "clustered" together under a particular cluster name. For example, URLs pointing to the same web site or a particular directory of the web site usually have the same set of URL parameters and are therefore often grouped into one cluster.

URLs within each cluster can be grouped into multiple sets (104-1, 104-2, 104-3, 104-4) using grouping criteria. The grouping criteria are based on a determination of which URL parameters are content-relevant and which are not. Such information is used for generating an equivalence rule for the cluster. A more detailed discussion of generating an equivalence rule is provided below in conjunction with FIGS. 2-6.

An application of each equivalence rule to its respective cluster of URLs divides the URLs into equivalence classes, e.g., classes 108-1, 108-2 and 108-3 are from cluster 102-1 and classes 108-4, 108-5 and 108-6 are from cluster 102-2. In some cases, all the URLs from a cluster may belong to a single equivalence class, because all the URLs in the cluster identify the same content, but such cases are unusual and not of interest in the present discussion. URLs within each equivalence class reference the same or nearly the same web pages and are therefore referred to as "duplicate URLs". Typically, the first URL joining an equivalence class is chosen as the class's representative URL and it may be used by a web crawler to fetch a corresponding web page from a web server. Given a candidate URL associated with a cluster, a screening is performed according to an equivalence rule to determine if there is an equivalence class in the cluster matching the URL, and different actions are taken in response to different results. A more detailed discussion of URL screening is provided below in conjunction with FIG. 7.

Process and Example

The accuracy of an equivalence rule of a cluster has a significant impact on the classification of the cluster into equivalence classes and association or non-association of one candidate URL with any one of them. For example, if a content-relevant parameter is mistakenly labeled as content-irrelevant, URLs that should have been associated with different equivalence classes having different parameter values may end up being associated with the same equivalence class. In such a situation, a plurality of the URLs assigned to the equivalence class may reference web pages that have distinct content, and the search engine would fail to cover those web pages having content distinct from the web page referenced by the representative URL of the equivalence class.

Similarly, if a content-irrelevant parameter is mistakenly labeled as content-relevant, two or more redundant equivalence classes may be created even though their member URLs actually reference the same web page. In this situation, the search engine may waste resources by downloading and processing duplicate web pages. This may also have a negative impact on the coverage of the search engine since it has only limited resources.

In general, the impact (on the quality of services provided by a search engine) of mislabeling a content-relevant parameter as content-irrelevant is more severe than that of mislabeling a content-irrelevant one as content-relevant. Therefore, some embodiments of the present invention tolerate a certain level of content duplication within a cluster. The extent of content duplication within a cluster is measured by the cluster's duplicate rate.

According to some embodiments, the duplicate rate of a cluster is defined as $$\text{Duplicate\_Rate} = \frac{\text{Number\_URL} - \text{Number\_Unique\_Content}}{\text{Number\_URL}},$$

wherein Number_URL represents the total number of URLs within the cluster and Number_Unique_Content represents the total number of web pages having distinct content (sometimes called the number of unique contents or "NUC") associated with the cluster. For example, when a cluster has 10 URLs with 5 URLs pointing to web page A and 5 URLs pointing to web page B, its duplicate rate is (10−2)/10=80%. When the number of URLs of the same cluster increases from 10 to 100 with 50 URLs pointing to web page A and 50 URLs pointing to web page B, its duplicate rate jumps to (100−2)/100=98%. An increased duplicate rate for this particular cluster is more statistically significant since there are ten times as many data samples in the second case as those in the first case repeating the same pattern.

A system for reducing the possibility of crawling duplicate URLs continuously monitors the results from crawling different URLs to determine if the actual duplicate rate of a particular cluster is higher than a predetermined threshold for the cluster. Whenever this occurs, the current equivalence rule associated with the cluster is deemed no longer valid and a new equivalence rule is generated for the cluster.

Figure 2:
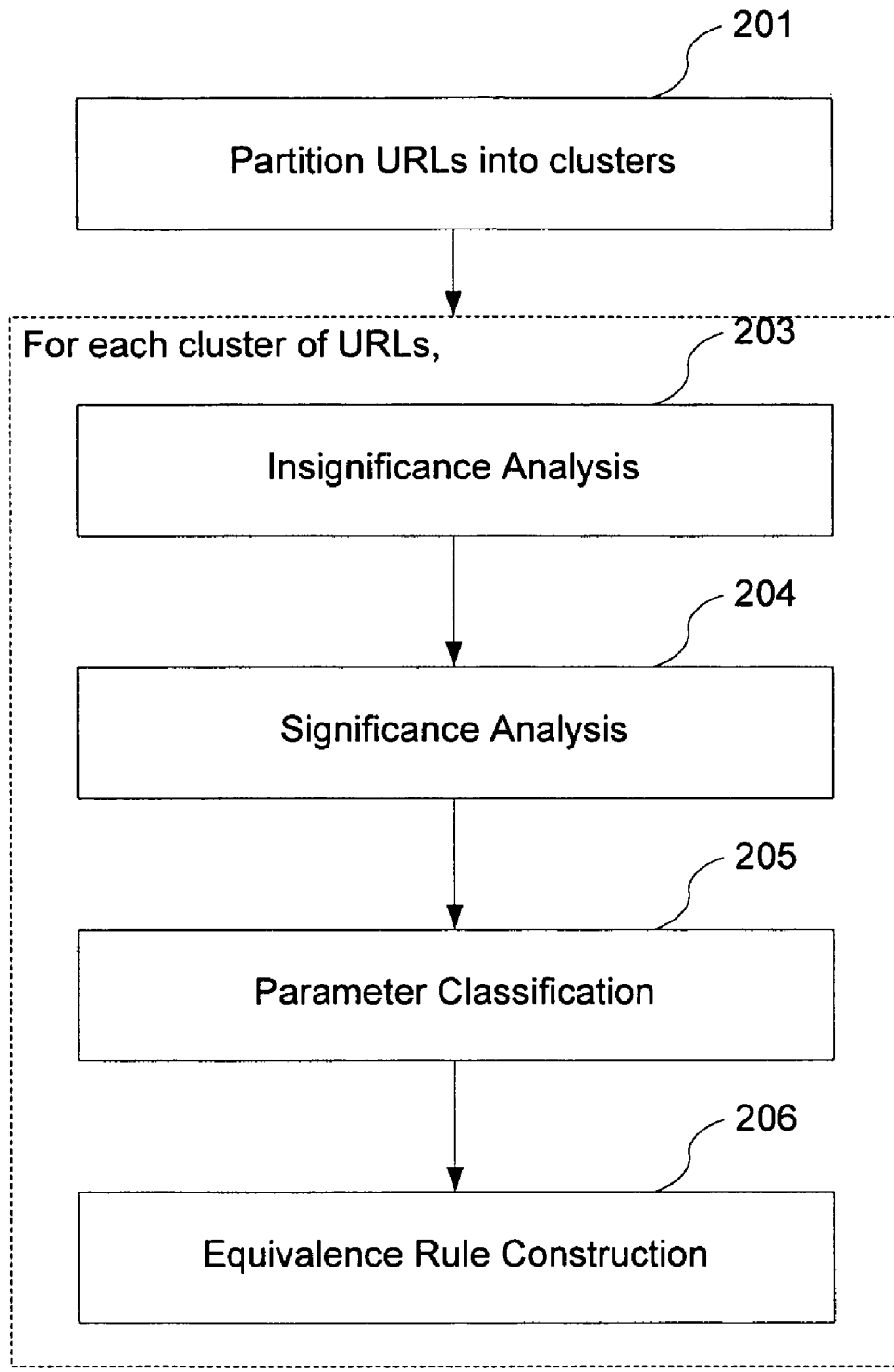
FIG. 2 is a flowchart depicting a process for generating equivalence rules for a plurality of URLs according to some embodiments of the present invention.

FIG. 2 is a flowchart depicting a sequence of processes for generating equivalence rules for a plurality of URLs according to some embodiments of the present invention. As shown in FIG. 1, the system first partitions the URLs into clusters (201). For each cluster of URLs, the system performs multiple analyses of the URLs within the cluster, including insignificance analysis (203), significance analysis (204) and parameter classification (205). Details of these analyses are discussed below in conjunction with FIGS. 3, 4 and 5, respectively. After performing these analyses, the system creates a new equivalence rule for each cluster (206) using the results of the analyses, and the newly-created rule is then used by the system to determine which URLs to crawl and when to crawl the URLs.

The equivalence rule of a cluster defines a relationship pattern between URL parameters and web pages associated with the cluster. These web pages may be retrieved during a regular crawl of the member URLs (i.e., prior to equivalence rule generation) or they may be downloaded for the purpose of rule generation. Since a web crawler is unlikely to be expressly informed by a particular web server about which parameters are content-relevant and which are not, this relationship pattern is derived using the URLs in the cluster and their associated web pages.

If a parameter is content-irrelevant, the following relationship pattern is likely to exist between the parameter and its associated web pages: different parameter values may be associated with a same web page. In the present invention, the procedure of identifying this relationship pattern is referred to as "insignificance analysis" and the extent of a parameter's insignificance (in determining a corresponding web page's content) is represented by its "insignificance index".

Figure 3:
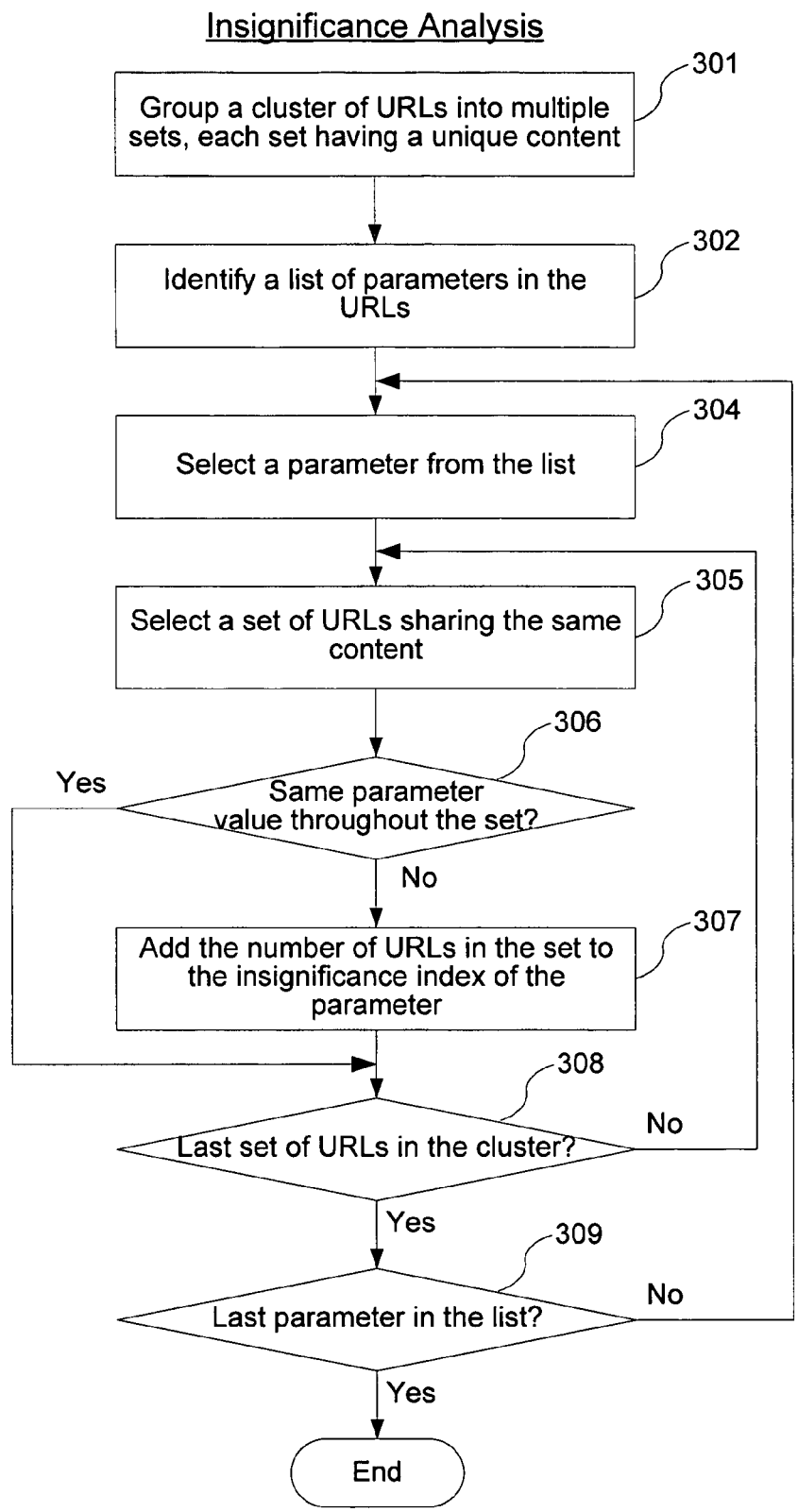
FIG. 3 is a flowchart illustrating how to measure a parameter's insignificance index in accordance with some embodiments of the present invention.

FIG. 3 is a flowchart illustrating how to measure a parameter's insignificance index using the aforementioned insignificance relationship pattern in accordance with some embodiments of the present invention. The system first groups a cluster of URLs into multiple sets (301), each set corresponding to a respective distinct document content. Next, the system identifies a list of parameters among the URLs to be analyzed (302). For instance, the list may include all parameters found in the URLs for the entire cluster of URLs. For each parameter in the list (304), the system checks if the parameter has the same value throughout each set of URLs corresponding to one particular content (305, 306). If true (306-Yes), this set of URLs does not match the insignificance relationship pattern, because the parameter has only one value throughout the set of URLs. The system then examines a next set of URLs until all of the sets of URLs have been checked (308-Yes). Otherwise (306-No), this set of URLs clearly matches the second relationship pattern. The system then adds the number of URLs in the set to the insignificance index of the parameter (307). At the end of the analysis, every URL parameter should have an insignificance index.

The insignificance analysis of a parameter addresses only one aspect of the relationship pattern between the parameter and its associated web pages. The significance analysis supplements the insignificance analysis by quantifying the significance of the parameter in determining a web page's content. The significance analysis and the insignificance analysis in combination provide a more holistic view of the role of the parameter in the cluster.

Generally speaking, there is a one-to-one mapping between a content-relevant parameter and a web page. The analysis methodology of FIG. 3, which is designed to identify content-irrelevant parameters, is not designed to directly characterize the one-to-one mapping between a content-relevant parameter and a web page. However, the significance of a parameter in determining a web page's content can be measured by temporarily removing the parameter from a URL.

Figure 4:
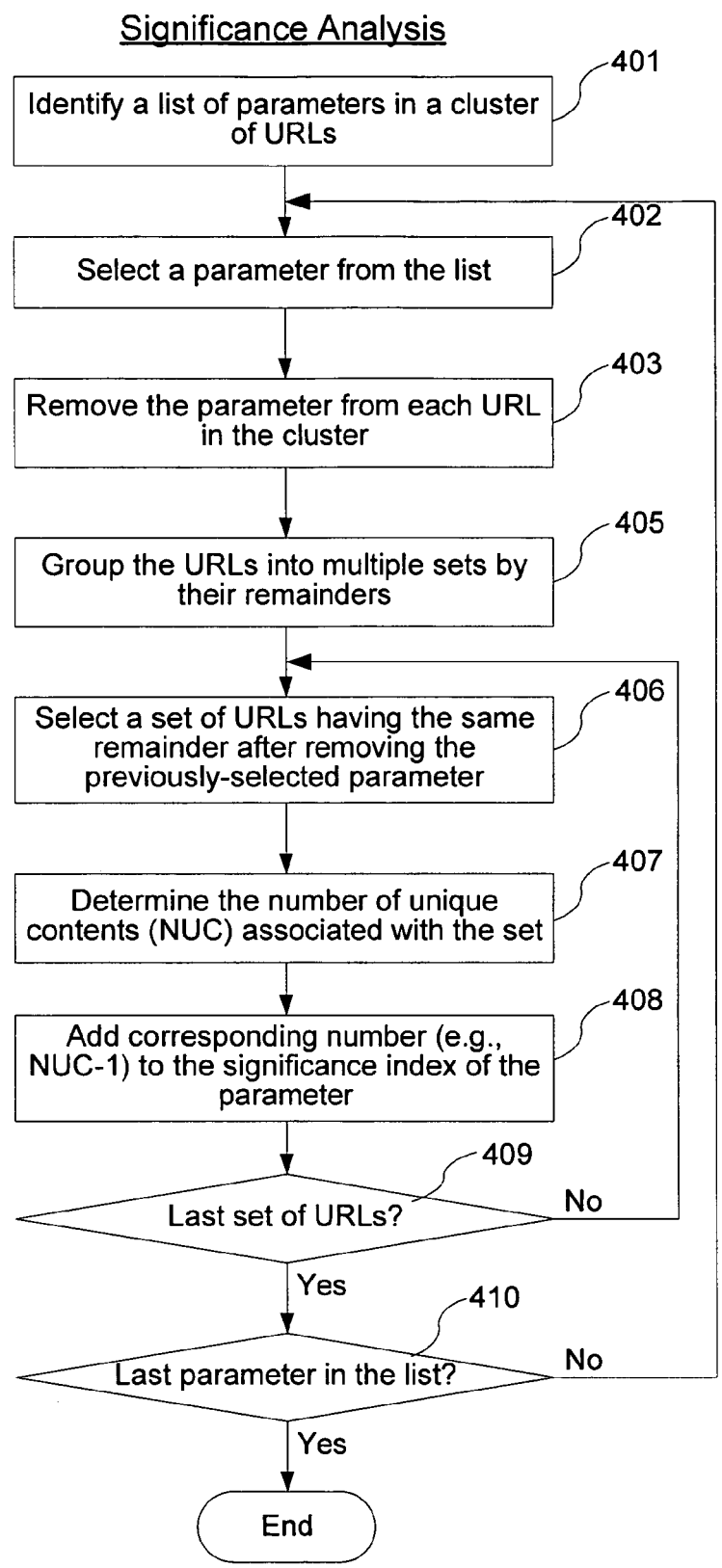
FIG. 4 is a flowchart illustrating how to measure a parameter's significance index according to some embodiments of the present invention.

FIG. 4 is a flowchart that illustrates how to measure a parameter's significance index according to some embodiments of the present invention. The system first identifies a parameter from a list of parameters associated with a cluster of URLs (401, 402) and then removes the parameter from each URL in the cluster (403), i.e., generating a URL remainder that does not include the parameter under analysis. Next, the system groups the URLs into multiple sets according to their respective URL remainders (405). For each set of URLs sharing the same URL remainder, the system determines the number (NUC) of distinct document contents associated with the set (407), and adds a corresponding number, (e.g., NUC-1), to the significance index of the identified parameter (408). This process is repeated for each set of URLs (409) and each parameter in the list of parameters (410). Since the URLs in a set have identical URL remainders, it can be reasonably inferred that the value of the missing parameter is the only factor that differentiates one URL from another URL in the same set. In other words, the reason that different URLs in the set correspond to different web pages is attributable to the missing parameter. Therefore, the significance of the parameter can be measured by adding up the number of unique contents within each set (408). At the end of the analysis, a significance index has been computed for each URL parameter.

Note that the significance and insignificance analyses described above are just two embodiments of methods of measuring the extent to which the parameter is content-relevant or content-irrelevant. It will be apparent to one skilled in the art that there are other approaches of calculating these two indexes or quantifying the relationship pattern between a parameter and a web page. For example, the insignificance index may be the sum of the number of distinct parameter values within each set, instead of the number of URLs within each set.

From the pair of indexes associated with each parameter, the system needs to define an equivalence rule that unequivocally decides whether the parameter is (1) content-relevant and therefore should be preserved or (2) content-irrelevant and therefore can be ignored when a cluster is partitioned into multiple equivalence classes.

Figure 5:
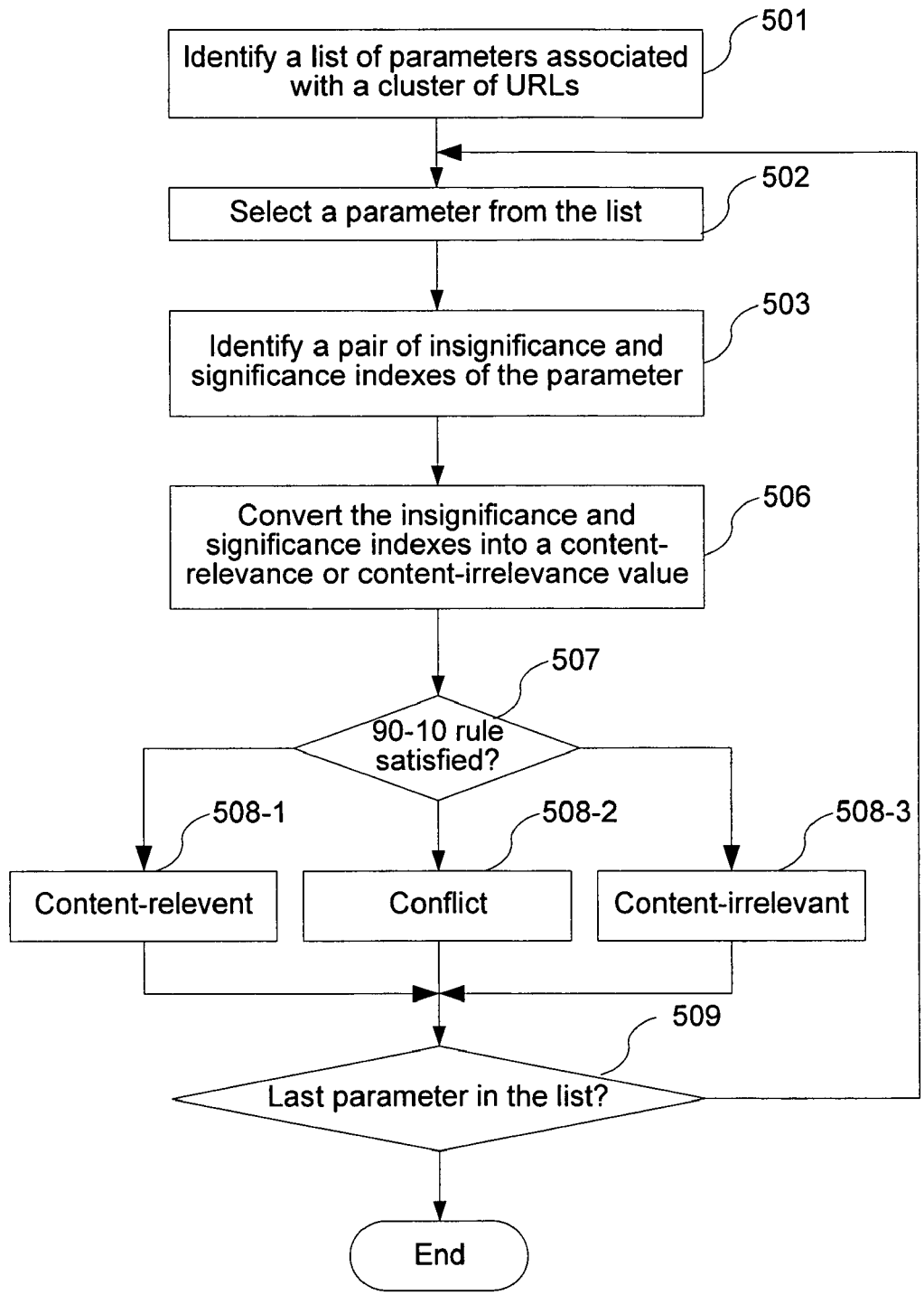
FIG. 5 is a flowchart illustrating the classification of URL parameters according to some embodiments of the present invention.

FIG. 5 is a flowchart illustrating a method of classifying URL parameters based on the insignificance and significance indexes, according to some embodiments of the present invention. The system identifies a list of parameters associated with a cluster of URLs (501). Note that this list of parameters is usually the same as the list of parameters that have been analyzed previously. For each parameter (502), the system identifies a pair of significance and insignificance indexes (503). Since the two indexes may be derived using different types of analyses (see, e.g., FIGS. 3 and 4), the system may convert them (i.e., normalize them) into a content-relevance or content-irrelevance value (506). In one embodiment, the content-relevance and content-irrelevance values are, respectively, defined through the normalization of the two indexes as:

$$\text{Content\_Relevance\_Value} = \frac{\text{Significance\_Index}}{\text{Significance\_Index} + \text{Insignificance\_Index}}, \text{ and}$$

$$\text{Content\_Irrelevance\_Value} = \frac{\text{Insignificance\_Index}}{\text{Significance\_Index} + \text{Insignificance\_Index}}.$$

Since the two values in this particular embodiment are complements to each other, only the content-relevance value is used below. The system applies a heuristic-based criterion, e.g., a 90-10 rule, to the content-relevance value of a parameter to select the category to be associated with the parameter (507). For example, if the content-relevance value is more than 90%, this parameter will be classified as "content-relevant" (508-1) and if the content-relevance value is less than 10%, this parameter will be classified as "content-irrelevant" (508-3). But if the value is less than 90% and more than 10%, this parameter may be classified as "conflict". The "conflict" classification indicates that the parameter was content relevant for some sets of URLs and content irrelevant for other sets of URLs. A system according to the present invention may arbitrarily define such a parameter as "content-relevant" to err on the safe side.

Note that the two index normalization formulas mentioned above are only for illustrative purposes. Depending upon how the two indexes are generated, there may be other ways of calculating normalized insignificance and significance values. Similarly, rules other than the 90-10 rule may be used for classifying URL parameters. For example, an 80-20 rule may be used in other embodiment. An 80-20 rule would classify fewer parameters as "conflict" parameters, and would potentially cause the search engine to miss a larger number of web pages having distinct content.

Figure 6:
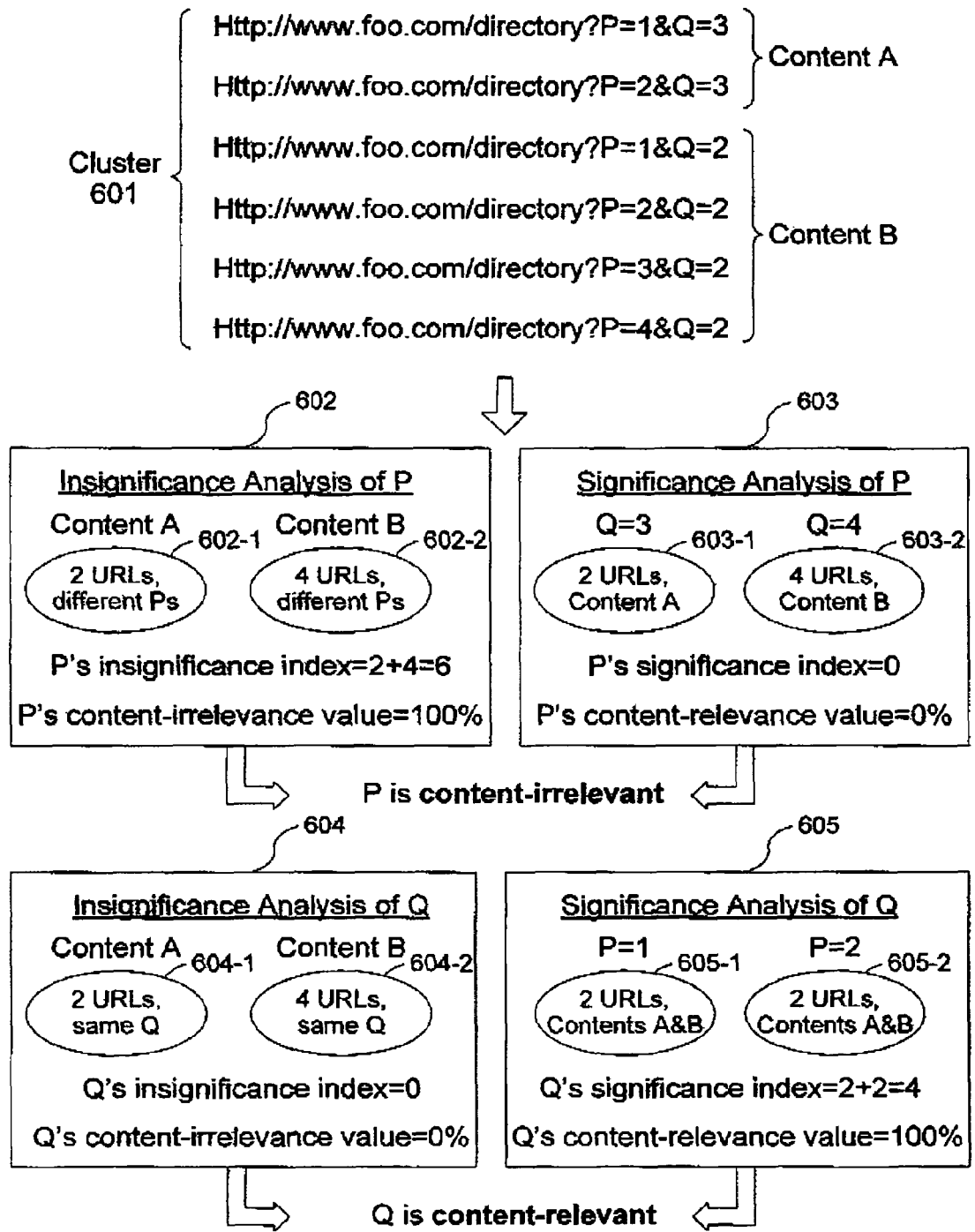
FIG. 6 is an exemplary block diagram illustrating how URL parameters associated with a cluster are classified according to some embodiments of the present invention.

FIG. 6 is an exemplary block diagram illustrating how URL parameters associated with a cluster are classified according to some embodiments of the present invention. Without losing generality, the cluster 601 includes six URLs, the first two URLs sharing one unique content "Content A" and the last four URLs sharing another unique content "Content B", and each URL has two parameters P and Q. In this example, the predefined duplicate rate threshold for the cluster is 50%. Since the duplicate rate of the cluster is (6−2)/6≈66.7%, it is time to generate a new equivalence rule for the cluster.

An insignificance analysis 602 of parameter P groups the six URLs into two sets 602-1 and 602-2 by their respective contents. P has at least two different values within each set. For example, P has two values (1 and 2) within the set 602-1 and four values (1, 2, 3 and 4) within the set 602-2. Therefore, P's insignificance index is 6.

By contrast, a significance analysis 603 of parameter P groups the same six URLs into another two sets 603-1 and 603-2 in accordance with their respective URL remainders after removing parameter P from each URL. Since there is only one unique content within each set, e.g., Content A for set 603-1 and Content B for set 603-2, P's significance index is 0.

Accordingly, the content-irrelevance or content-relevance value is 100% or 0%, respectively, indicating that P is a content-irrelevant parameter. Repeating the same process against the other parameter, Q, indicates that parameter Q is probably content-relevant. Based on these analysis results, the system generates a new equivalence rule that ignores parameter P and considers only parameter Q when partitioning the cluster into different equivalence classes and when associating a candidate URL with any existing equivalence class. It will be appreciated by one skilled in the art that, even though real-life clusters may have significantly more URLs and parameters than the one shown in FIG. 6, the analysis and classification methods discussed above are equally applicable to such clusters.

Figure 7:
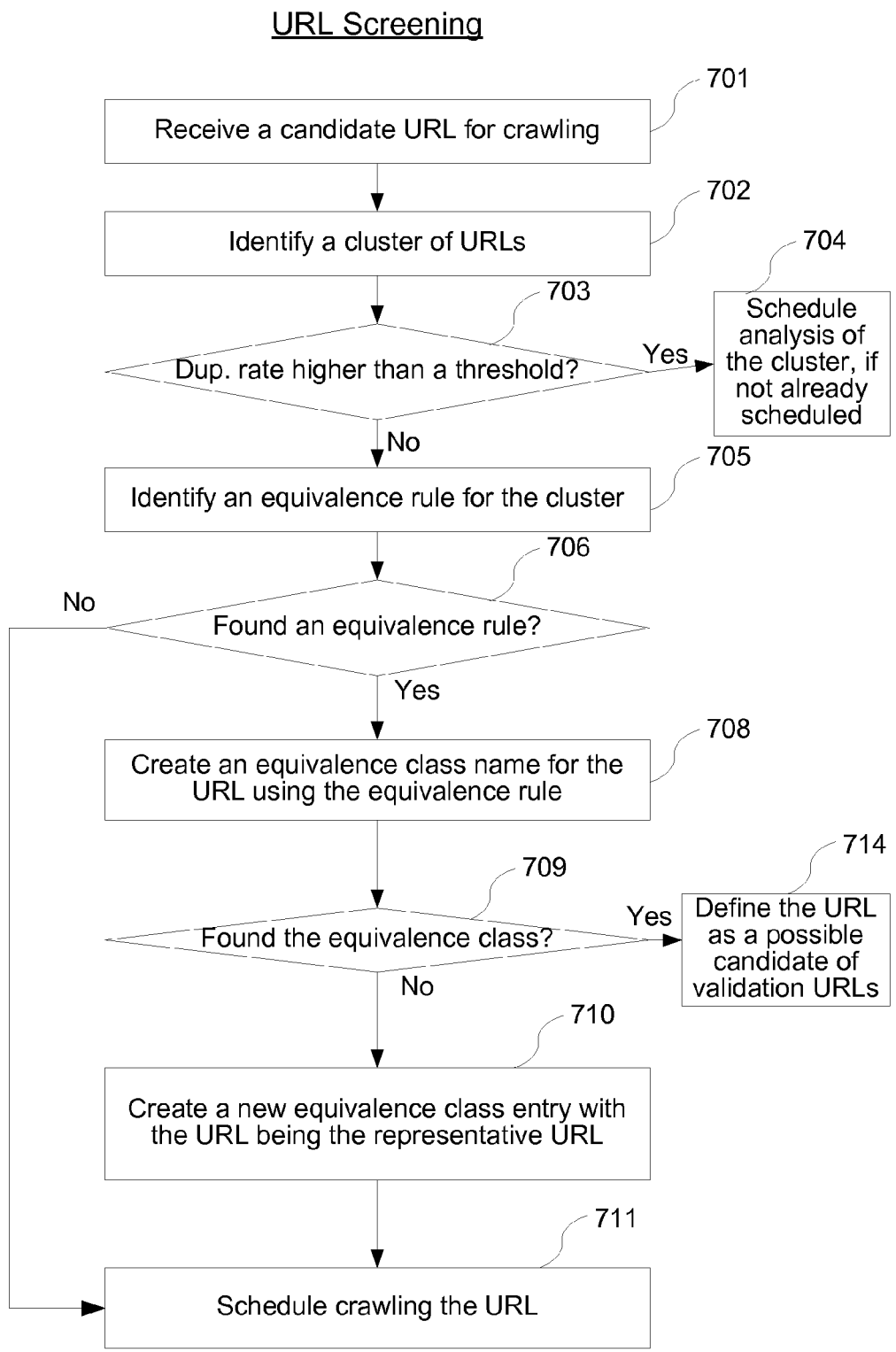
FIG. 7 is a flowchart illustrating how to perform a screening of a candidate URL prior to its scheduled crawling according to some embodiments of the present invention.

As mentioned above, an equivalence rule is used for checking if there is an existing equivalence class for a candidate URL, prior to a decision being made whether to schedule the URL for crawling. FIG. 7 is a flowchart illustrating how to perform a screening of a candidate URL prior to scheduling it for crawling according to some embodiments of the present invention.

Upon receiving a candidate URL (701), the system first identifies a cluster of URLs (702) using a cluster name derived from the candidate URL. If no existing cluster matches the derived cluster name, the system creates a new cluster that includes one and only one member URL, i.e., the candidate URL. Of course, this is a trivial case since there is no duplicate URL in the newly-created cluster, and therefore it is not necessary to associate an equivalence rule with the new cluster.

If an existing cluster matches the derived cluster name, the system then checks if the duplicate rate of the cluster is higher than a predefined threshold (703). If so (703-Yes), the system schedules a new round of analysis of the cluster in the future to generate a new equivalence rule, unless the same analysis has already been scheduled in response to an earlier candidate URL, processed earlier than the current candidate URL (704). Otherwise (703-No), the system attempts to identify an equivalence rule for the cluster (705). Note that a cluster may not have an equivalence rule if its duplicate rate has never been above the predefined threshold or its equivalence rule has expired. In some embodiments, an equivalence rule expires if it is not used for a predefined period of time. If an appropriate equivalence rule is not found (706-No), there is no need for any further screening of the URL and it is scheduled to be crawled by a web crawler (711) at a later time.

If a valid equivalence rule is found (706-Yes), the system applies the rule to the URL to create an equivalence class name (708) and then checks if an equivalence class with such a name exists or not (709). The equivalence class name may be generated at 708 from the candidate URL by removing all parameters classified as content-irrelevant, and optionally by putting the remaining parameters (if any) in a predefined, canonical order. If an equivalence class with this name does not yet exist (709-No), the system simply creates a new equivalence class with the candidate URL being its representative URL (710) and arranges a crawling schedule for the candidate URL (711). If an equivalence class is indeed found (709-Yes), the system would not crawl the candidate URL, and instead it determines whether to identify the original candidate URL as a validation URL for the equivalence rule (714) in accordance with predefined selection criteria for selecting the validation URLs for an equivalence rule, as explained in more detail below.

The generation of an equivalence rule and a set of equivalence classes for a cluster is by no means a one-time effort. There are multiple factors that may affect the validity of the equivalence rule and the equivalence classes. For example, the cluster may not have a sufficiently large number of URLs initially and, as a result, the relationship pattern between a parameter and its associated web pages derived from a limited number of URLs may be skewed or inconsistent with the actual significance of the parameter. Therefore, after a cluster has accumulated enough URLs, the system may need to revisit the equivalence rule created previously. In addition, a web server may change how it uses a particular parameter, from content-irrelevant to content-relevant or vice versa, rendering the original equivalence rule no longer appropriate.

Whenever any of these situations occurs, not only may the equivalence rule have to be updated, but also some of the equivalence classes created according to the original rule may need to be split (e.g., when a content-irrelevant parameter becomes content-relevant) or merged (e.g., when a content-relevant parameter becomes content-irrelevant). Sometimes, the representative URL of an equivalence class may become inaccessible to a web crawler, or may point to content that is both different than the content it previously pointed to and different from the content pointed to by other URLs in the equivalence class. Therefore, it is often necessary to validate the representative URL of an equivalence class using other URLs in the same class.

Figure 8A:
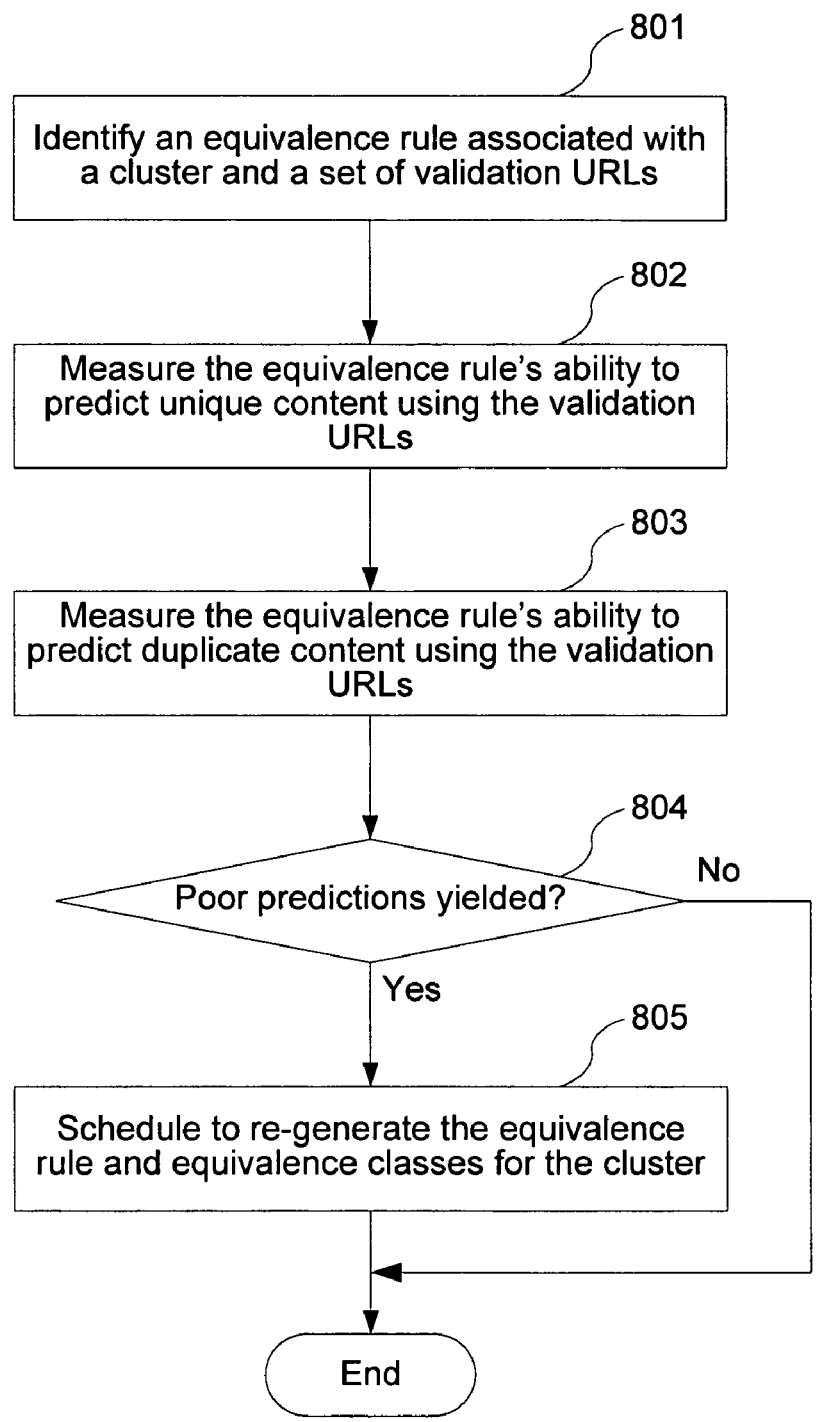
FIG. 8A is a flowchart illustrating how to validate an equivalence rule associated with a cluster of URLs according to some embodiments of the present invention.

FIG. 8A is a flowchart illustrating a method of validating an equivalence rule associated with a cluster of URLs according to some embodiments of the present invention. The system first identifies an equivalence rule associated with a cluster and a set of validation URLs (801). In one embodiment, none of the validation URLs have been processed by the equivalence rule previously, but at least one of them should be associated with the same cluster. Some of the validation URLs are known to correspond to unique document contents (i.e., distinct document content compared with the content associated with existing equivalence classes) not related to any existing equivalence classes and some of them are known to correspond to duplicate contents that are currently present in the existing equivalence classes.

The system performs two document content type related checks for these validation URLs, one checking whether a new equivalence class is predicted for each unique URL (802) and the other checking if an existing equivalence class is predicted for each duplicate URL (803). If either or both checks yield poor prediction results (804-Yes), the system may schedule to re-create the equivalence rule and equivalence classes for the cluster (805). In some embodiments, poor prediction results are defined in accordance with the fraction of URLs that yield incorrect results. For example, if there were 10 validation URLs, six of which are predicted to produce distinct document content, and four of which are predicted to produce duplicate document content, and the checks yield existing equivalence classes for three URLs which were predicted, incorrectly, to produce distinct document content, and two new classes for two URLs which were predicted to produce duplicate documents, the fraction of incorrect results is (3+2)/10=5/10=50%. If the misprediction rate is greater than a predetermined threshold (e.g., 30%), that triggers recreation of the rule.

Figure 8B:
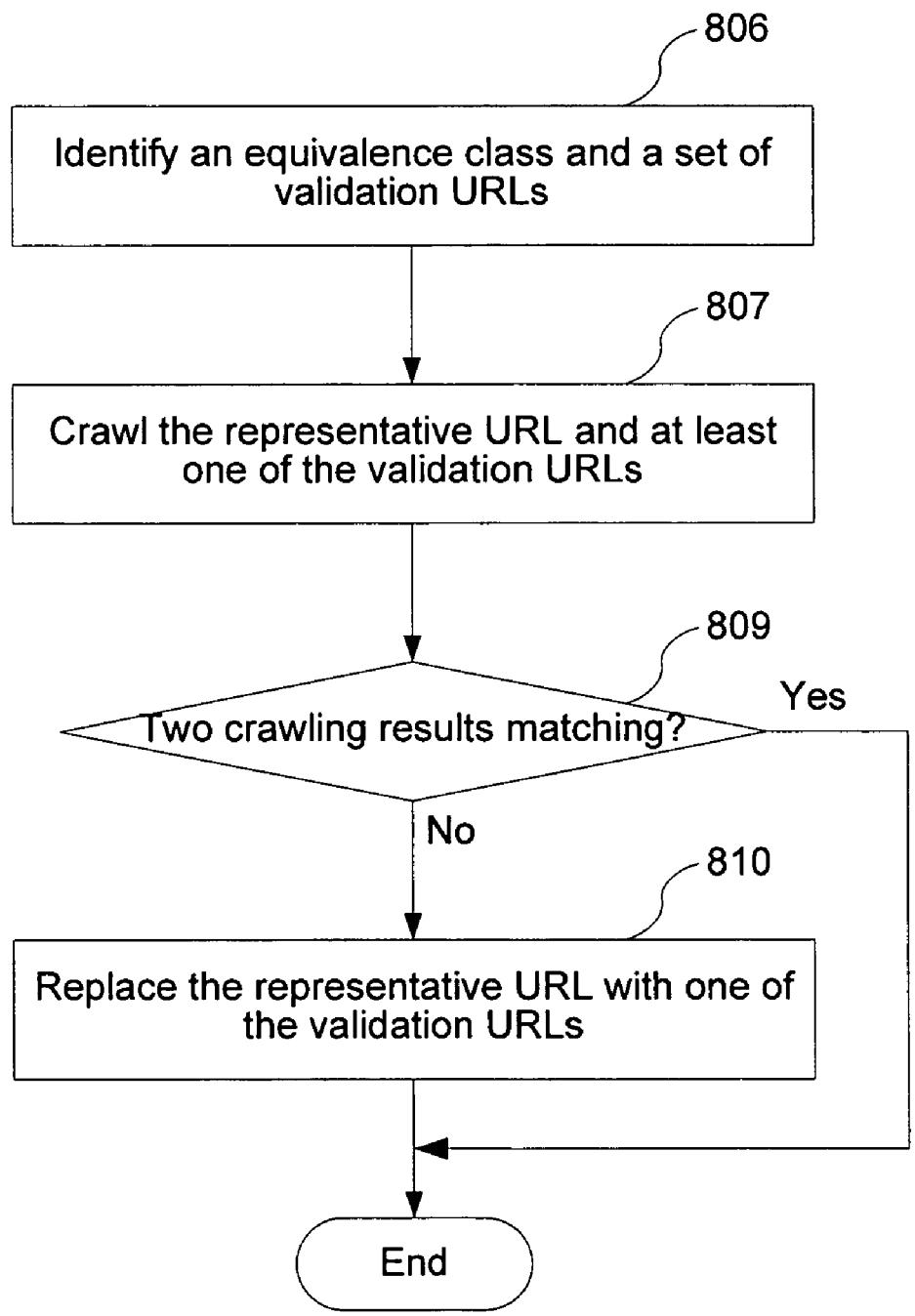
FIG. 8B is a flowchart illustrating how to validate the representative URL of an equivalence class according to some embodiments of the present invention.

FIG. 8B is a flowchart illustrating how to validate the representative URL of an equivalence class according to some embodiments of the present invention. The system first identifies an equivalence class and a set of validation URLs (806). In one embodiment, the validation URLs are a subset of the candidate URLs that have been encountered by the system previously (see box 714 of FIG. 7) and therefore belong to the same equivalence class. The system re-crawls the representative URL of the equivalence class and at least one of the validation URLs. If both crawls return the same web page (809-Yes), the representative URL is deemed still valid and no further action is required. If not (809-No), e.g., the representative URL has become inaccessible, the system may replace it with one of the newly-crawled validation URLs (810). To do so, the system needs to crawl at least two validation URLs to make sure that they both reference the same web page (i.e., the same content).

Since having too many validation URLs per cluster would increase the system's workload with marginal benefits, predefined selection criteria may be invoked when choosing validation URLs from many possible candidates. For example, the system may take into account the diversity that a candidate can bring into an equivalence class in terms of both parameter names and parameter values. If the representative URL has a unique parameter that is not part of any existing validation URL, a new candidate having this parameter should be given a higher priority (for selection as a validation URL) than another one that does not. Similarly, old validation URLs may be replaced with new ones on a regular basis, provided that the replacements do not significantly reduce the overall diversity associated with an equivalence class. In some embodiments, validation URLs are selected by finding the candidate URLs having the greatest "distance" from the representative URL and from each other. The distance between the candidate URLs and the distance between the candidate URLs and the representative URL may be determined using any suitable distance metric, such as the Levenshtein distance metric (of which there are numerous implementations). Use of a URL distance metric to select validation candidates helps to ensure diversity among the validation URLs. When several candidates are equally qualified as validation URLs, a random coin toss may be used to choose one of them.

The validation of an equivalence rule or class associated with a cluster may be triggered by an event, e.g., when the number of URLs in the cluster increases by a certain number within a predetermined time period, or repeated on a regular basis, e.g., whenever the equivalence rule or class has been in existence for a certain time period and is therefore deemed stale.

In some embodiments, a timer is set for an equivalence class. After the lapse of certain time, a web crawler is notified by the timer to re-crawl the representative URL of the equivalence class to determine its accessibility. If the representative URL becomes inaccessible, the equivalence class is eliminated from the system. Subsequently, after another URL associated with the same equivalence class is crawled, the equivalence class will be reconstructed by the system with that URL as its new representative URL.

In some other embodiments, the system does not eliminate an equivalence class when its representative URL becomes inaccessible. Instead, the equivalence class is marked as invalid by the system. Subsequently, after another URL associated with the same equivalence class is crawled (and therefore accessible), the equivalence class will be marked as valid and that URL replaces the old representative URL as the new one.

A change to an equivalence rule may bring changes to multiple equivalence classes. For example, when a parameter switches from content-relevant to content-irrelevant, the system creates a new equivalence class entry with a new equivalence class name by merging multiple equivalence classes. In one embodiment, a representative URL associated with one of the equivalence classes and having the highest pagerank is chosen as the representative URL of the newly-created equivalence class.

When a parameter changes from content-irrelevant to content-relevant, the system creates a new equivalence class to replace an old equivalence class that is founded on the assumption that the parameter is content-irrelevant. In one embodiment, the representative URL of the new equivalence class is the same as the one of the old equivalence class (if it is still valid). Subsequently, another new equivalence class is created when another URL with a different parameter value is crawled.

So far, it has been assumed that URL parameters associated with a cluster are always independent from each other and therefore each cluster has one and only one equivalence rule. When some URL parameters become inter-dependent, e.g., a parameter may be content-relevant when another parameter has one value or has any of a first set of values and convent-irrelevant when the other parameter has another value or values, the system may have to split the cluster into multiple sub-clusters. Accordingly, the equivalence rule may also need to include two or more sub-rules to deal with different sub-clusters by incorporating more restrictions. For example, one sub-rule may be applicable only to URLs that have a specific set of parameter names, and another sub-rule may be applicable only to URLs in which a set of parameters is always present in a particular order. These additional restrictions, however, should not limit the applicability of the aforementioned principles on how to generate and update equivalence rules and classes to each individual sub-cluster and sub-rule.

In some embodiments, URL interpretations are case-insensitive and any URL including its parameters needs to be converted into lower case prior to any substantive analytical procedure. But if the system fails to deduce a meaningful equivalence rule through a case-insensitive analysis, e.g., too many parameters are classified as conflict, a re-run of a case-sensitive analysis of the cluster may be desirable to produce one or more useful equivalence rules for the cluster.

Given a new cluster having no equivalence rule, it may take a long time to accumulate a sufficient number of URLs within a cluster in order to develop an accurate and stable equivalence rule for the cluster. On the other hand, different web sites adopting same or similar content management systems may have the same or similar behaviors. For example, they may share a same set of parameters and each parameter name may have the same attribute in terms of content relevance. Therefore, the system may first synthesize an equivalence rule for a newly-created cluster that has few URLs using existing rules that are associated with other clusters having similar behaviors and then repeatedly verify the validity of the synthesized equivalence rule. This synthesized rule is also subject to other normal validation procedures discussed above. An advantage of this approach is that it usually takes less time to generate a reliable equivalence rule for the cluster.

Sometimes, the system may also keep track of the statistics of different parameter names, e.g., the likelihood that a parameter name is deemed content-irrelevant or content-relevant. In the case that no synthesized equivalence rule is available for a newly-created cluster, the system may create an initial guess as to the classification of each parameter of the cluster using these statistic about the same or similar parameter names.

System Architecture

Figure 9:
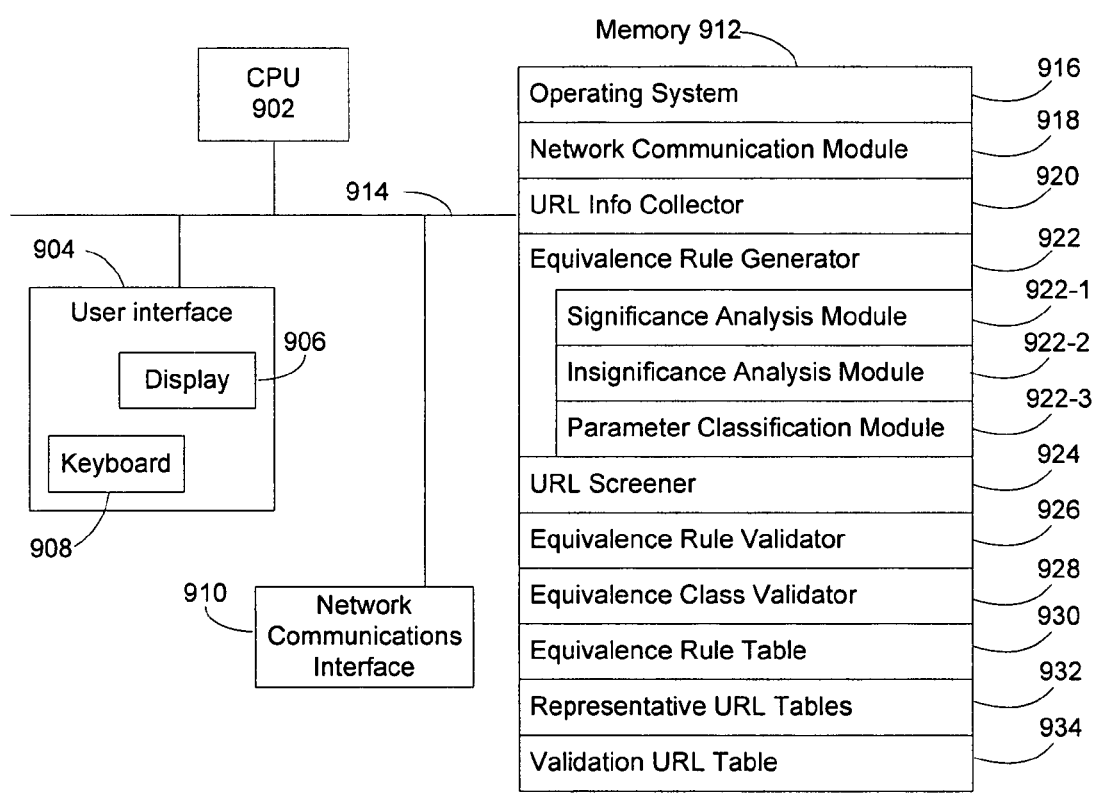
FIG. 9 is a block diagram illustrating a duplicate document identifier management system in accordance with some embodiments of the present invention.

FIG. 9 is a block diagram illustrating a duplicate document identifier management system in accordance with some embodiments of the present invention. The system typically includes one or more processing units (CPUs) 902, one or more network or other communications interfaces 910, memory 912, and one or more communication buses 914 for interconnecting these components. The system optionally includes a user interface 904 that comprises a display device 906 and a keyboard 908. The memory 912 may include includes high-speed random access memory, such as DRAM, SRAM, DDR RAM or other random access solid state memory devices; and may include non-volatile memory, such as one or more magnetic disk storage devices, optical disk storage devices (e.g., CDROM, DVD, etc.), flash memory devices, or other non-volatile solid state storage devices. The memory 912 may optionally include one or more storage devices remotely located from the CPUs 902. The memory 912, or alternatively one or more storage devices (e.g. one or more of the non-volatile storage devices) within memory 912, includes a computer readable storage medium. In some embodiments, the memory 912 stores the following elements, modules and data structures, or a subset or superset thereof:

- an operating system 916 that includes procedures for handling various basic system services and for performing hardware dependent tasks;
- a network communication module (or instructions) 918 that is used for connecting the system to other computers via the one or more network communications interfaces 910 (via wired or wireless connection), using the Internet, other wide area networks, local area networks, metropolitan area networks, and so on;
- a URL information collector 920 (also called a URL partitioning module) for processing newly-crawled web pages, e.g., identifying an existing or new cluster for each web page and updating the duplicate rate of each containing cluster;
- an equivalence rule generator 922 for deducing a new equivalence rule for a cluster of URLs, and for each URL parameter, the generator further including a significance analysis module 922-1 for creating a significance index, an insignificance analysis module 922-2 for creating an insignificance index and a parameter classification module 922-3 for classifying the parameter into a particular category, e.g., content-relevant, conflict or content-irrelevant;
- a URL screener 924 (also called a URL grouping module) for performing a screening of a candidate URL for crawling, such as identifying a cluster for the URL, applying an equivalence rule to the URL, and identifying an equivalence class and its representative URL for the candidate URL;
- an equivalence rule validator 926 for applying a set of validation URLs to an equivalence rule to determine its accuracy in predicting the document content type of a particular URL;
- an equivalence class validator 928 for applying a set of validation URLs to an equivalence class to determine the validity of its representative URL;
- an equivalence rule table 930, each entry of the table including at least one cluster name representing a cluster of URLs and an equivalence rule derived from the URLs;
- one or more representative URL tables 932, each entry of the tables including at least a unique equivalence class name and a representative URL; and
- a validation URL table 934, each entry of the table including at least a cluster name that references one or more equivalence class names and each equivalence class name further referencing one or more validation URLs that may be used for validating an equivalence rule or an equivalence class.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 912 may store a subset of the modules and data structures identified above. Furthermore, memory 912 may store additional modules and data structures not described above.

Although FIG. 9 shows a "duplicate document identifier management system," FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement a system and how features are allocated among them will vary from one implementation to another, and may depend in part on the amount of data traffic that the system must handle during peak usage periods as well as during average usage periods.

FIG. 10A is a block diagram illustrating exemplary tables for storing equivalence rules and equivalence classes in accordance with some embodiments of the present invention. In particular, each entry in the equivalence rule table 1001 includes a cluster name, a duplicate rate, an equivalence rule, a timestamp indicative of when the rule is created and an analysis flag indicative of whether the rule needs to be re-created, etc. Whenever the duplicate rate of a cluster is above a predefined threshold, the corresponding analysis flag will be marked so as to stop applying the equivalence rule to any new candidate URL. In some other embodiments, the equivalence rule itself may be so complicated (e.g., when parameters are inter-dependent upon each other) that it is stored in a separate table together with its timestamp. In this case, an entry of the equivalence rule table 1001 may include a pointer referencing a corresponding equivalence rule in that table. In some embodiments, the timestamp of an equivalence rule is regularly checked by an equivalence rule validator to determine whether the rule is too stale and therefore needs to be reviewed or not.

Each entry of the representative URL tables (1002-1, 1002-2) includes an equivalence class name, a representative URL, a content checksum and a timestamp, etc. The equivalence class name is the same for any URL in the class. The content checksum associates any URL in the class with a web page that has been retrieved using the representative URL previously. This checksum can be used by the equivalence class validator to verify the validity of the representative URL, e.g., to determine if the document content referenced by the representative URL has changed or not. The timestamp is used by the validator to decide when it is time to re-validate the class.

Figure 10B:
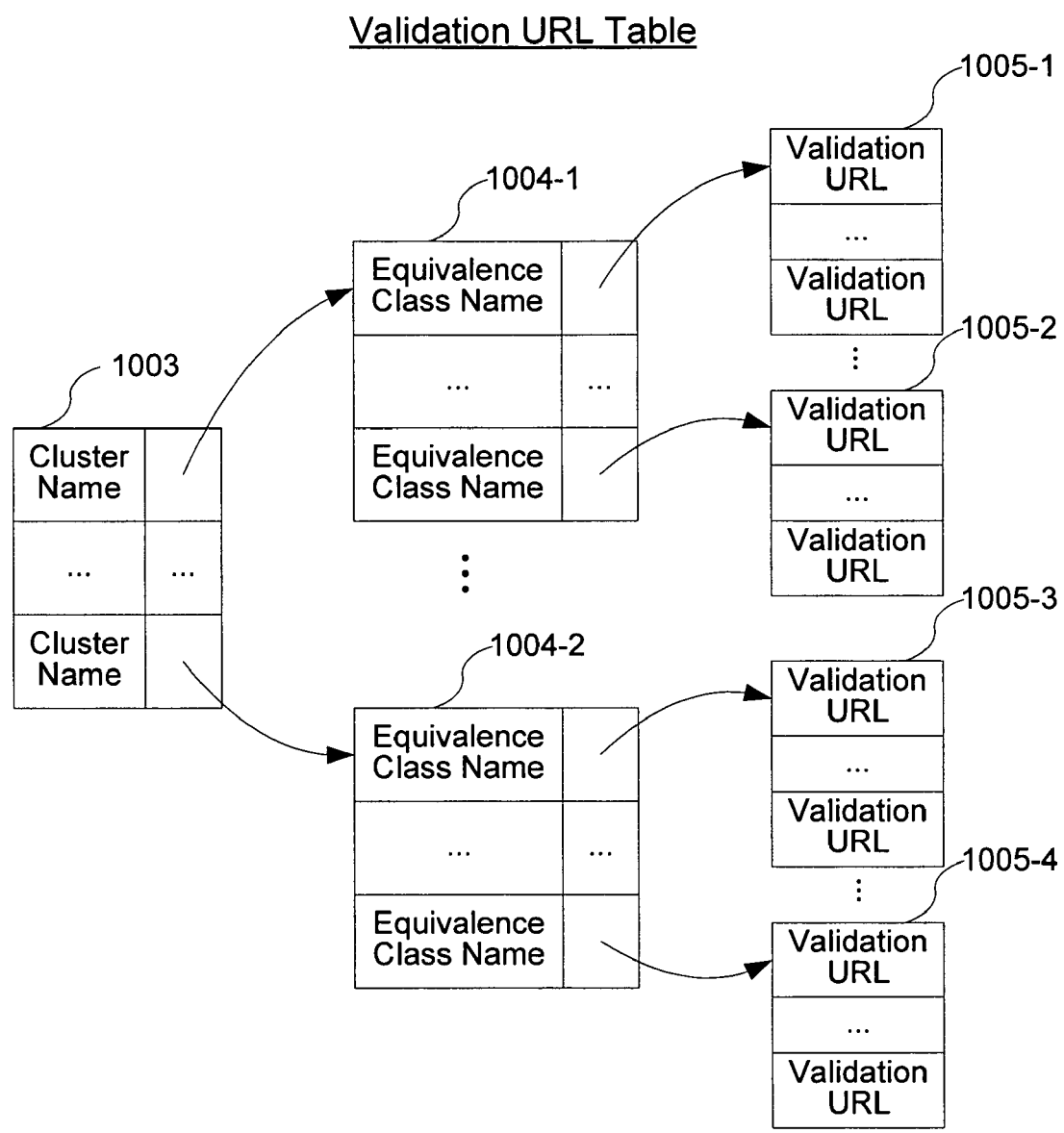
FIG. 10B is a block diagram illustrating an exemplary data structure for storing a plurality of validation URLs associated with multiple clusters and equivalence classes in accordance with some embodiments of the present invention.

FIG. 10B is a block diagram illustrating an exemplary data structure for storing a plurality of validation URLs associated with multiple clusters in accordance with some embodiments of the present invention. Each entry in the table 1003 includes a cluster name and a pointer referencing another table (1004-1, 1004-2) hosting a plurality of equivalence class names. Similarly, each equivalence class name has a pointer referencing another table (1005-1, 1005-2, 1005-3, 1005-4) hosting a plurality of validation URLs. In this case, each set of validation URLs stored in a table (1005-1, 1005-2, 1005-3, or 1005-4) is used for validating an equivalence class identified by a class name in a corresponding table (1004-1 or 1004-2) and multiple sets of validation URLs associated with the same table (1004-1 or 1004-2) are used for validating an equivalence rule associated with the cluster name in table 1003.

Note that the tables shown in FIGS. 10A and 10B are only for illustrative purposes. It will be apparent to one skilled in the art that many other equivalent data structures may be used to achieve the same or similar results.

Although some of various drawings discussed above illustrate a number of logical stages in a particular order, stages which are not order-dependent may be reordered and other stages may be combined or broken out. While some reorderings or alternate groupings may be specifically mentioned, others will be obvious to one ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of grouping document identifiers by their document contents, comprising:

partitioning a plurality of document identifiers into multiple clusters, wherein the document identifiers in each cluster comprising universal resource locators (URLs) are selected so as to have the same hostname, wherein each document identifier is a text string that identifies exactly one document, each cluster has a cluster name, and each cluster has a set of URL parameters, wherein each URL parameter is a text string contained within the URLs in the cluster;

generating an equivalence rule for at least one cluster, the equivalence rule specifying which of the URL parameters associated with the cluster are content-relevant; and grouping a respective cluster into a plurality of equivalence classes in accordance with its equivalence rule, each equivalence class including URLs that correspond to a document content associated with the equivalence class, wherein all the URLs in a respective equivalence class of the plurality of equivalence classes have the same hostname and reference documents having substantially the same content;

identifying a single one of the URLs within each equivalence class as its representative document identifier; and with respect to a respective equivalence class having a plurality of URLs, performing a particular computer-implemented operation on only the single representative URL of the equivalence class.

2. The method of claim 1, wherein said generating an equivalence rule for at least one cluster includes:

performing one or more analysis procedures for each of the URL parameters associated with the cluster;

deriving from said analysis procedures one or more values indicative of a relationship pattern between the URL parameter and its associated document contents; and classifying the URL parameter into one of multiple categories in accordance with its values.

3. The method of claim 2, wherein performing the one or more analysis procedures includes performing an insignificance analysis of each URL parameter associated with the cluster.

4. The method of claim 3, wherein performing the insignificance analysis of a particular URL parameter includes:
grouping document identifiers in the cluster into multiple sets, each set corresponding to a unique document content with respect to other sets; and
computing an insignificance index for the particular URL parameter in accordance with the number of document identifiers in each set in which the particular URL parameter has at least two different parameter values.

5. The method of claim 4, further including a numeric insignificance threshold, wherein the particular URL parameter is classified as content-relevant if its insignificance index is less than the insignificance threshold.

6. The method of claim 2, wherein performing the one or more analysis procedures includes significance analysis of each URL parameter associated with the cluster.

7. The method of claim 6, wherein the significance analysis of a respective URL parameter further includes:
removing the respective URL parameter from each document identifier associated with the cluster, each document identifier having a document identifier remainder;
grouping the document identifiers into multiple sets, each set having a distinct document identifier remainder; and
summing up the number of distinct document contents within each set that has at least two different document contents as the URL parameter's significance index.

8. The method of claim 7, further including a numeric significance threshold, wherein the respective URL parameter is classified as content-irrelevant if its significance index is less than the significance threshold.

9. The method of claim 1 further including:
selecting a set of validation URLs for the equivalence rule;
checking if the equivalence rule correctly predicts a document content type for each of the validation URLs; and
repeating said generating and grouping until said checking determines that the equivalence rule correctly predicts a document content type for each of the validation URLs.

10. The method of claim 9, wherein a URL more different than another one from the selected validation URLs is given a higher priority in the selection of validation URLs.

11. The method of claim 1 further including:
selecting a set of validation URLs for each equivalence class associated with the cluster, the equivalence class having a representative URL;
checking if a document content referenced by the representative URL is substantially identical to a document content referenced by said validation URL; and
replacing the representative URL with one of the validation URLs if the checking produces a negative result.

12. The method of claim 11, wherein selecting a set of validation URLs for an equivalence class includes identifying, from among a set of URLs in the equivalence class, a first URL having a greater distance from the URL than a second URL in the set of URLs in the equivalence class, in accordance with a predefined distance metric.

13. The method of claim 1, wherein performing the particular computer implemented operation includes:
performing a search engine operation on only the single representative URL of the equivalence class.

14. A computer readable storage medium storing one or more programs for execution by one or more processors, the one or more programs comprising:
a partitioning module for partitioning a plurality of document identifiers into multiple clusters, the document identifiers comprising universal resource locators (URLs), wherein each document identifier is a text string that identifies exactly one document, each cluster has a cluster name, and each cluster has a set of URL parameters, wherein each URL parameter is a text string contained within the URLs in the cluster;
an equivalence rule generator for generating an equivalence rule for a cluster of URLs, the equivalence rule specifying which of the URL parameters associated with the cluster are content-relevant; and
a grouping module for grouping a respective cluster into a plurality of equivalence classes in accordance with its equivalence rule, each equivalence class including URLs that correspond to a document content associated with the equivalence class wherein all the URLs in a respective equivalence class of the plurality of equivalence classes have the same hostname and reference documents having substantially the same content;
an identifying module for identifying a single one of the URLs having the same hostname within each equivalence class as its representative document identifier; and
an operation module for performing, with respect to a respective equivalence class having a plurality of URLs, a particular computer-implemented operation on only the single representative URL of the equivalence class.

15. The computer readable storage medium of claim 14, wherein said equivalence rule generator including instructions for:
performing one or more analysis procedures for each of the URL parameters associated with the cluster;
deriving from said analysis procedures one or more values indicative of a relationship pattern between the URL parameter and its associated document contents; and
classifying the URL parameter into one of multiple categories in accordance with its values.

16. The computer readable storage medium of claim 15, wherein performing the one or more analysis procedures includes performing an insignificance analysis of each URL parameter associated with the cluster.

17. The computer readable storage medium of claim 16, wherein performing the insignificance analysis of a particular URL parameter includes:
grouping document identifiers in the cluster into multiple sets, each set corresponding to a unique document content with respect to other sets; and
computing an insignificance index for the particular URL parameter in accordance with the number of document identifiers in each set in which the particular URL parameter has at least two different parameter values.

18. The computer readable storage medium of claim 17, further including a numeric insignificance threshold, wherein the particular URL parameter is classified as content-relevant if its insignificance index is less than the insignificance threshold.

19. The computer readable storage medium of claim 15, wherein performing the one or more analysis procedures includes significance analysis of each URL parameter associated with the cluster.

20. The computer readable storage medium of claim 19, wherein the significance analysis of a respective URL parameter further includes:
removing the respective URL parameter from each document identifier associated with the cluster, each document identifier having a document identifier remainder;

grouping the document identifiers into multiple sets, each set having a distinct document identifier remainder; and summing up the number of distinct document contents within each set that has at least two different document contents as the URL parameter's significance index.

21. The computer readable storage medium of claim 20, further including a numeric significance threshold, wherein the respective URL parameter is classified as content-irrelevant if its significance index is less than the significance threshold.

22. The computer readable storage medium of claim 14, further including an equivalence rule validation module for:

selecting a set of validation URLs for the equivalence rule;

checking if the equivalence rule correctly predicts a document content type for each of the validation URLs; and repeating said generating and grouping until said checking determines that the equivalence rule correctly predicts a document content type for each of the validation URLs.

23. The computer readable storage medium of claim 22, wherein a URL more different than another one from the selected validation URLs is given a higher priority in the selection of validation URLs.

24. The computer readable storage medium of claim 14, further including an equivalence rule validation module for:

selecting a set of validation URLs for each equivalence class associated with the cluster, the equivalence class having a representative URL;

checking if a document content referenced by the representative URL is substantially identical to a document content referenced by said validation URL; and replacing the representative URL with one of the validation URLs if the checking produces a negative result.

* * * * *